United States Patent [19]

Horikawa et al.

[11] 4,320,523
[45] Mar. 16, 1982

[54] DIGITAL SIGNAL RECEPTION SYSTEM

[75] Inventors: Izumi Horikawa, Yokohama; Masaaki Shinji, Sekiu, both of Japan

[73] Assignee: Nippon Telegraph & Telephone Public Corporation, Tokyo, Japan

[21] Appl. No.: 118,229

[22] Filed: Feb. 4, 1980

[30] Foreign Application Priority Data

Feb. 13, 1979 [JP] Japan .................................. 54-14360

[51] Int. Cl.³ .............................................. H04B 1/10
[52] U.S. Cl. ..................................... 375/103; 455/307
[58] Field of Search ..................... 375/4, 99, 100, 101, 375/103; 455/63, 135, 295, 296, 299, 306, 307, 311, 312; 364/574, 825

[56] References Cited

U.S. PATENT DOCUMENTS

| | | | |
|---|---|---|---|
| 3,737,799 | 6/1973 | Stander | 455/307 |
| 3,902,014 | 8/1975 | Lindell | 375/4 |
| 3,932,818 | 1/1976 | Masak | 375/103 |
| 4,085,368 | 4/1978 | Yeh | 375/101 |
| 4,123,625 | 10/1978 | Chow | 375/4 |
| 4,130,806 | 12/1978 | Van Gerwen | 375/103 |

OTHER PUBLICATIONS

Equalization Design for a 600 MBD Quantized Feedback PCM Repeater, by B. Gibson, IEEE Transactions on Communications, vol. COM-27, No. 1, Jan. 1979, pp. 134-141.

*Primary Examiner*—Jin F. Ng
*Assistant Examiner*—Tommy P. Chin
*Attorney, Agent, or Firm*—Martin Novack

[57] ABSTRACT

The error rate performance of a digital radio system which is deteriorated due to inband interference components can be effectively improved by adopting the present digital signal reception technique. According to the present invention, a narrow band band-elimination filter removes the interference, and after the digital signal is regenerated, the spectrum, which is removed by said band-elimination filter, is recovered from the regenerated digital signal. The recovered digital signal is added to the original one, and is applied to the regenerator. Thus, even though an interference component interfers with the digital signal in the same pass-band, said interference component is removed by the present invention and one can obtain the digital signal without the interference component.

15 Claims, 11 Drawing Figures

DIGITAL SIGNAL RECEPTION SYSTEM

BACKGROUND OF THE INVENTION

The present invention relates to a digital signal reception system, in particular, relates to such a system and which provides a superior error rate performance under a low S/N transmission path corrupted by high power and narrow band interferences within the digital signal frequency band.

To improve the S/N (signal-to-noise ratio) of the digital signal, a prior digital signal reception system is composed as shown in FIG. 1. In FIG. 1, the digital radio signal at the input terminal 100 is applied to the bandpass filter 1, which passes the whole frequency spectrum of the digital signal and eliminates the thermal noise and the interference noise outside the passband. Thus, the signal-to-noise ratio of the digital signal is improved by the bandpass filter 1. The demodulator 4 is connected to the output of the filter 1, and said demodulator 4 provides the demodulated baseband signal. The timing signal regenerator 5 recovers the timing signal from the demodulated baseband signal, and the regenerator 6, which is connected to the output of the demodulator 4, regenerates the digital signal by using the timing signal from said timing signal regenerator 5. Thus, the regenerated digital signal is obtained at the output terminal 101 connected to the output of the regenerator 6.

However, said prior digital signal reception system has the disadvantage that the S/I (signal-to-interference power ratio) can not be improved when an interference noise (N) exists within the digital signal frequency band (D) as shown in FIG. 2(A). Therefore, in order to obtain the required S/N or S/I, the receiving power must be increased by shortening the hop distance, and/or increasing the transmitting power. However, those techniques increase the number of repeater stations, the size of the radio set and the power consumption of the set, and degrades the reliability of the apparatuses.

When a digital radio system is newly constructed in the same radio frequency band and in a different route with existing analog FDM-FM systems, the digital radio system should be designed as follows. First, the intersystem interference from the digital system to the existing FM system has to be reduced to less than the allowable limit of the FM system. Secondly, the required C/I (carrier to interference power ratio) of the digital system has to be satisfied.

The relationship of the spectrum between the digital system and the analog FM system is shown in FIG. 2B, where D is the spectrum of the digital circuit. It should be noted that the analog FM signal of an interference gives almost the same effect to the digital system as in the case of FIG. 2A. In FIGS. 2A and 2B, the center frequency of the digital radio signal and the interference signal is $f_O$, and $f_O + f_I$, respectively.

When a new digital radio system is constructed in the same frequency hand and in different route with an FM system, an antenna with excellent directivity has to be employed to reduce the intersystem interference. Alternatively, the repeater station site for the digital circuit has to be selected so that the incident angle of the analog FM circuit to the antenna of a digital circuit is large enough in order to attenuate the analog FM power by antenna directivity. If the site selection is restricted and the incident angle to the antenna between the analog and the digital circuits is not large enough, the transmitting power of the digital system must be sufficiently increased to provide the required signal-to-noise ratio.

As mentioned above, it becomes difficult to newly construct a digital system under the co-existance condition with a conventional FM system, because site selection for the digital system and/or the transmitting power of the digital system are significantly limited.

SUMMARY OF THE INVENTION

Therefore, the purpose of the present invention is to overcome those disadvantages of a prior digital signal reception system by providing a new and improved digital signal reception system.

It is also an object of the present invention to provide a new digital signal reception system which effectively reduces an inband interference energy without degradation of the digital signal.

The foregoing and other objects are attained by a digital signal reception system comprising at least an input terminal to which a modulated digital signal is applied, a demodulator for demodulating the signal at the input terminal to provide the demodulated baseband digital signal, a regenerator connected to the output of the demodulator to regenerate the transmitted digital signal, and output terminal connected to the output of the regenerator to provide the regenerated digital signal, a band-elimination filter to remove the inband interference component before the stage of said regenerator, a bandpass filter connected substantially to the output of said output terminal, the center frequency of said bandpass filter being the same as that of said band-elimination filter, an adder to provide the sum of the said band-elimination filter output and the said bandpass filter output, and means for applying the output of said adder to the input of said regenerator.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
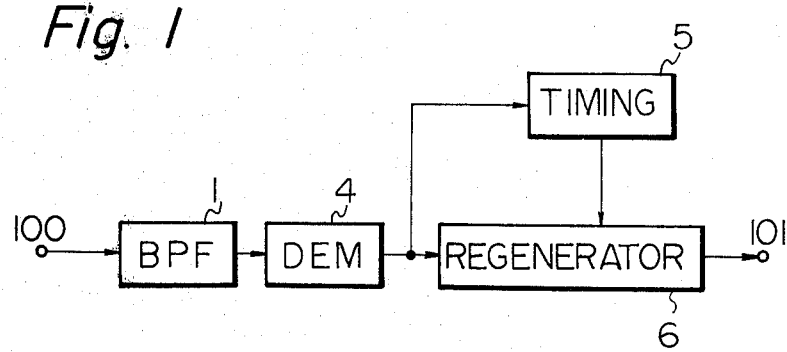
FIG. 1 is a brief block diagram of the prior receiver for a digital transmission system.
Figure 2A:
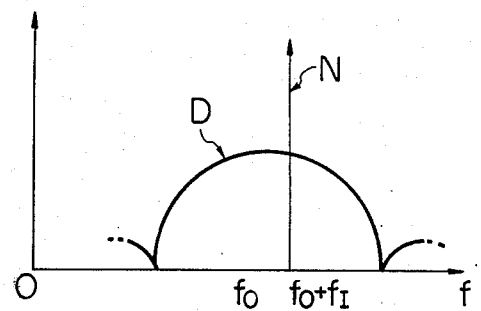
FIG. 2(A) and FIG. 2(B) show two spectrum examples of a digital signal and a narrow band interference signal.
Figure 2B:
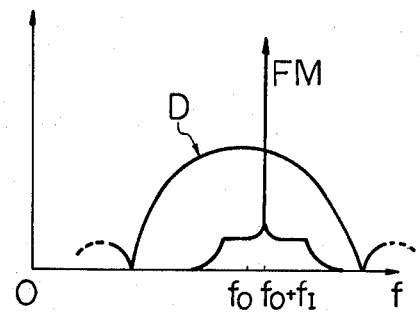
Figure 3:
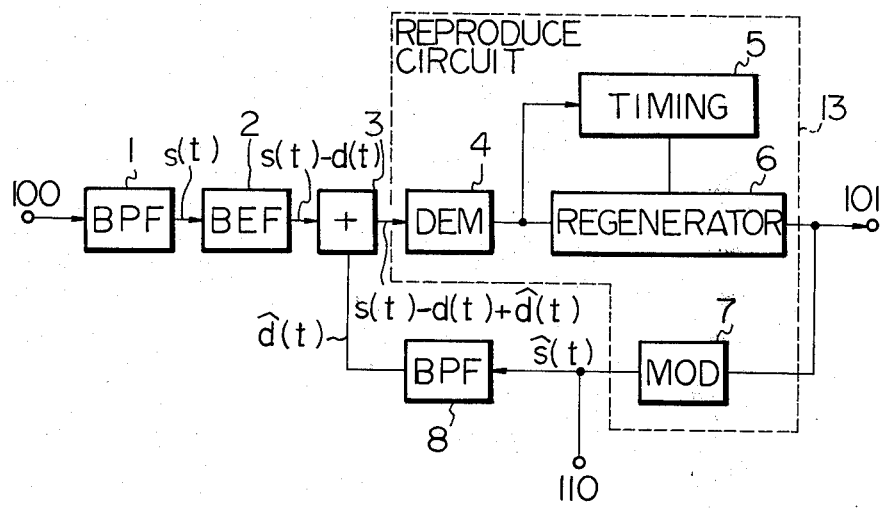
FIG. 3 is the block diagram of the present receiver in which the present invention is adopted in a radio frequency stage.

FIG. 3 shows the receiver block diagram according to the present invention, in which the present reception system is used in a radio frequency band. In FIG. 3, the reference numeral 100 is the input terminal to which the radio frequency signal, which includes both the digital signal and the interference component, is applied, 1 is a bandpass filter which passes almost all the digital signal spectrum, 2 is the band-elimination filter having a very narrow bandwidth, 3 is an adder in carrier frequency band, 8 is a narrow band bandpass filter, and 13 is a signal reproducing circuit equipped with a demodulator 4, a timing signal regenerator 5, a regenerator 6, and a modulator 7. Also, 101 is an output terminal connected to the output of the regenerator 6 to provide the demodulated baseband signal, and 110 is another output terminal connected to the output of the modulator 7, and the modulated signal at the output terminal 110 is coupleable to the transmitter at the repeater stations. It should be noted that the center frequency of the bandpass filter 8 is the same as that of the band-elimination filter 2, and those filters can be implemented by a YIG filter (Yttrium-Iron-Garnet), which operates on the magnetic resonance principle of a YIG single crystal in the magnetic field. The YIG filter is described in "Microwave Filters, Impedance-Matching Networks, and Coupling Structures" page 1027, published by McGraw-Hill, U.S.A. Alternatively, said filter 2 and/or 8 can be implemented by an ordinary LC circuit with a varactor diode as a variable capacitor. The adder 3 is implemented by a directional coupler or Y-shaped waveguide divider.

The operation of the receiver in FIG. 3 is as follows.

Figure 4:
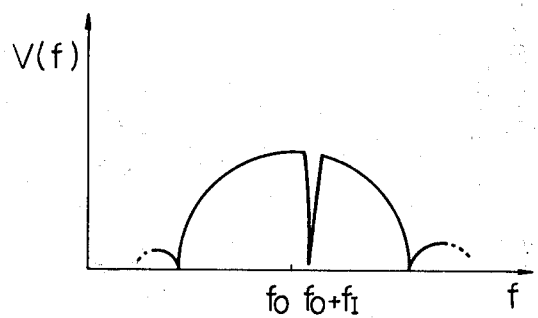
FIG. 4 shows the frequency spectrum of the received digital signal at the output of the narrow-band band-elimination filter 2 in FIG. 3.

The received digital signal, including an interference component, which is applied to the input terminal 100, is applied to the bandpass filter 1, which removes the wide band thermal noise and/or the interference noise. Then, the output of the bandpass filter 1 is applied to the narrow band band-elimination filter 2, which eliminates the narrow band interference component within the passband of the digital signal as shown in FIG. 4. In FIG. 4, it is assumed that the center frequencies of the digital signal, the interference component, and the band-elimination filter 2 are $f_O$, $f_O+f_I$, and $f_O+f_I$, respectively. Therefore, the narrow band interference component and the narrow band component of the digital signal of which center frequency is $f_O+f_I$ are simultaneously removed from the received signal by the band-elimination filter 2. At the output of the filter 2, the digital signal is distorted due to the lack of a portion of the signal frequency component. The distorted digital signal is applied to one input of the adder 3, and the other input of the adder 3 receives the signal which is extracted from the bandpass filter 8 and is similar to the removed digital spectrum as mentioned later. Finally, the output of the adder 3 is not distorted.

The demodulator 4 demodulates the received signal and provides the baseband digital signal. The timing signal regenerator 5 recovers the timing signal from the demodulated output of the demodulator 4. Then, by using this timing signal, the regenerator 6 regenerates the digital pulse stream which is applied to the output terminal 101. Next, the regenerated digital signal at the output terminal 101 is applied to the modulator 7, which modulates the same carrier frequency as the received radio frequency at the input terminal 100 by the digital signal. Thus, the same spectrum as the received signal is obtained at the output of the modulator 7. If the apparatus in FIG. 3 is for a repeater, the output of the modulator 7 is coupleable to the transmitter through the terminal 110. The output of the modulator 7 is also applied to the bandpass filter 8, of which center frequency is $f_O+f_I$ and is the same as the center frequency of the band-elimination filter 2. Thus, the bandpass filter 8 reproduces the spectrum, which is similar to the one removed by the band-elimination filter 2, and the reproduced spectrum at the output of the bandpass filter 8 is applied to the input of the adder 3. It should be noted that the output of the bandpass filter 8 is free from the noise and/or the interference, since the noise and/or the interference component is effectively removed through the regeneration process in the regenerator 6. As a result, the complete spectrum of the received digital signal, which is also free from the interference component, is obtained at the output of the adder 3.

Figure 5:
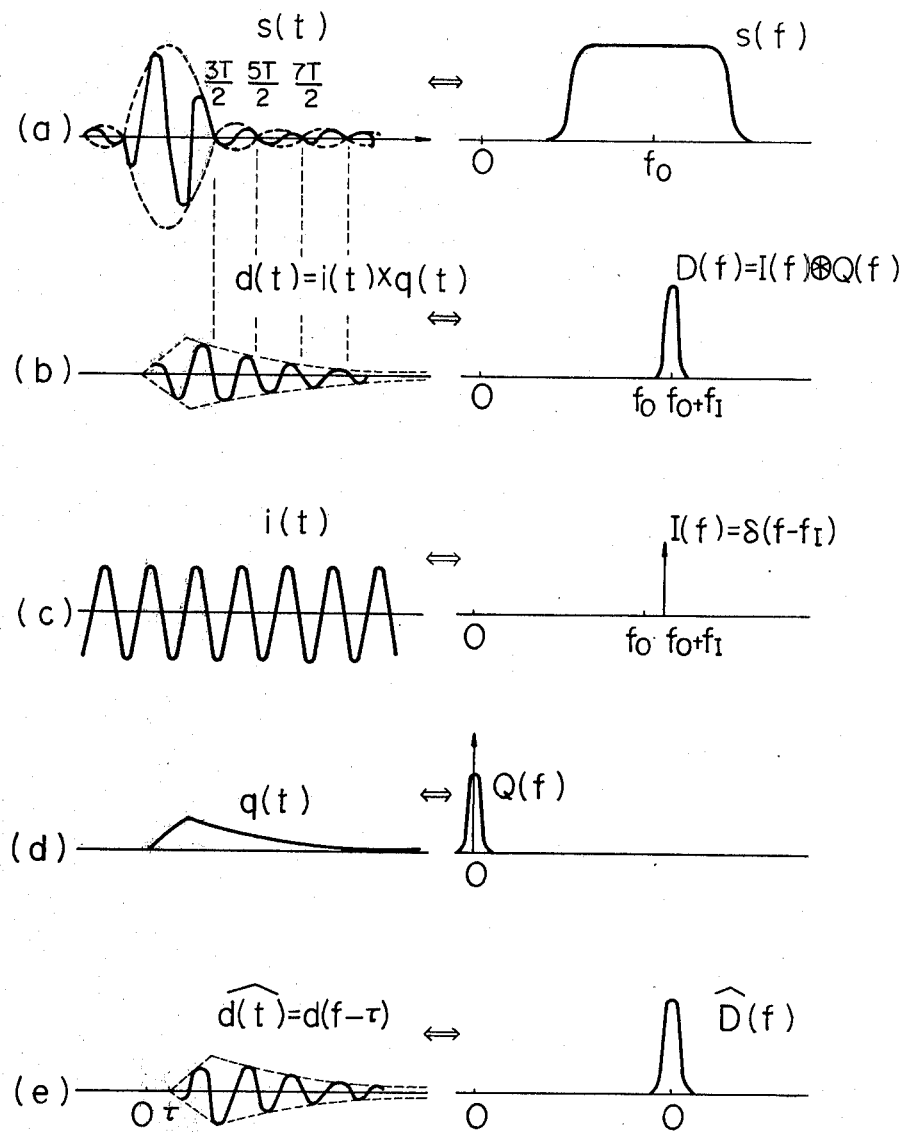
FIG. 5 illustrates the waveforms and the spectrums to make clear the operation of the apparatus of FIG. 3.

FIG. 5 illustrates the waveforms of the apparatus in FIG. 3. In FIG. 5, the left column shows the waveforms in the time domain, and the right column shows the spectrum in the frequency domain. It is assumed that the envelope of the digital signal s(t) at the output of the bandpass filter 1 has the zero response at the time $t=(2n+1)T/2$ except $(t=T/2)$, where T is the pulse repetition period of the digital signal and n is an integer. The spectrum of the digital signal s(t) (FIG. 5(a) left) is s(f) as shown in right column of FIG. 5(a). Assuming that the received signal is corrupted by the narrow band interference, the frequency component of the center frequency $f_O+f_I$ is removed by the band-elimination filter 2. The removed spectrum component is D(f), as shown in right column of FIG. 5(b). The time domain signal d(t) of the spectrum D(f) is shown in the left column of FIG. 5(b), and the input signal of the adder, which is distorted from the original signal s(t), is (s(t)−d(t)). In this case, the distortion signal d(t) is expressed by the product of i(t) and q(t), as shown in the left column of FIG. 5(b), where i(t) is the time domain expression of the delta function I(f) as shown in FIG. 5(c), and q(t) is the time domain expression of the equivalent base-band component Q(t) as shown in FIG. 5(d), since said D(f) is provided by the convolution integral of said delta function I(t) and the baseband component Q(t). Therefore, the response of d(t) causes the intersymbol interference at $t=nt/2$. In order to reduce the intersymbol interference, the present invention employes the principle that the regenerated pulse signal has completely the same waveform (the same spectrum) as the transmitted digital signal in the digital communication system, and the intersymbol interference comes from the subtraction of the distortion component d(t). According to the present invention, the distortion component $\hat{d}(t)$ which is the approximation of the d(t), is derived from the regenerated signal through the narrow band bandpass filter 8, and said $\hat{d}(t)$ is applied to the adder 3. As a result, the interference is sufficiently improved without intersymbol interference at the output of the adder 3.

In a practical apparatus, the compensation signal $\hat{d}(t)$ is added with the time difference $\tau$, which is sum of the necessary delay time for pulse decision and the absolute delay time in the feedback loop circuit having the adder 3, the regenerator 6, the modulator 7 and the filter 8. Some residual intersymbol interference due to that delay time may occur. However, the residual distortion is substantially neglected, because the delay time τ is so short. Finally, an excellent error rate performance can be obtained. Although the above explanation concerns the ideal Nyquist pulse waveform, it is apparent that the same analysis is possible for any pulse waveform.

Figure 6:
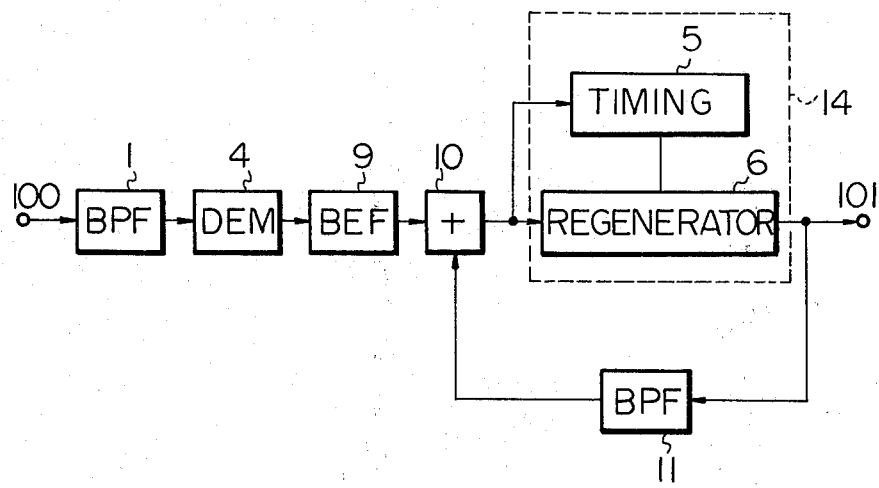
FIG. 6 is the another configuration of the present invention in which the present invention is incorporated in the baseband stage.
Figure 7:
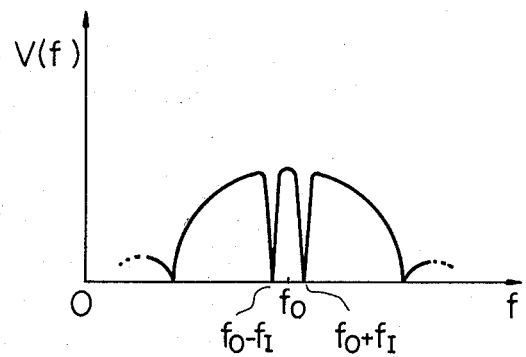
FIG. 7 shows the equivalent radio frequency spectrum of the digital signal at the output of the band-elimination filter 9 in FIG. 6.

FIG. 6 is another configuration of the present invention, and the same reference numerals as those mentioned in the previous drawings show the same members. The radio frequency signal at the input terminal 100 is applied to the demodulator 4 through the bandpass filter 1, and the baseband signal is obtained at the output of the demodulator 4. Then, the output of the demodulator 4 is applied to the narrow band band-elimination filter 9 (having center frequency $f_I$) which removes the interference component and the spectrum of the digital signal at frequency $f_I$ simultaneously. The output of the filter 9 is applied to the adder 10. It should be noted that the band-elimination filter with the center frequency $f_I$ in the baseband (after demodulation) is equivalent to the rf filter which removes the spectrums $f_O+f_I$, and $f_O-f_I$ in the carrier frequency band. Therefore, the interference component is apparently removed as shown in FIG. 7. In the configuration of FIG. 6, the waveform distortion is caused by the band-elimination filter 9. So, the bandpass filter 11 of the center frequency $f_I$ is connected to the output of the regenerator 6 to compensate that distortion. The output of the filter 11 is applied to one input of the adder 10.

Thus, the narrow band interference is effectively reduced without digital signal waveform distortion.

Figure 8:
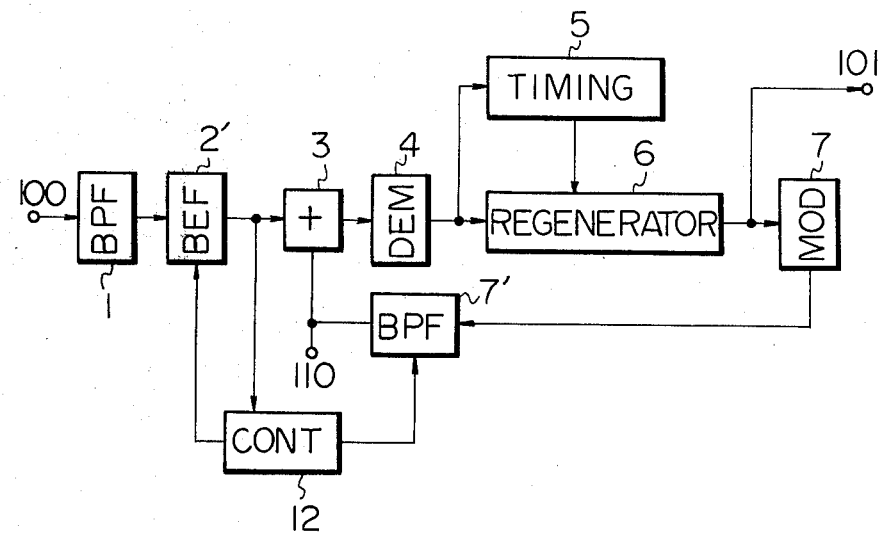
FIG. 8 is the another configuration of the present receiver, which adaptively operates to eliminate an interference signal.

FIG. 8 is still another embodiment of the digital signal reception system according to the present invention, in which an adaptive operation to the change of the interference frequency is performed. The difference between the embodiments in FIG. 3 and FIG. 8 is that the apparatus of FIG. 8 the adaptive filters 2' and 7' instead of ordinary filters 2 and 7, and also the apparatus of FIG. 8 has the control circuit 12 to control the center frequency of filters 2' and 7'.

In operation, the control circuit 12 sweeps the center frequency of the filters 2' and 7', maintaining zero frequency difference between the filter 2' and the filter 7', and said control circuit 12 receives an output of the band-elimination filter 2' in order to determine the interference center frequency. After that, the interference center frequency being determined, the center frequency of the filters 2' and 7' is fixed at the frequency. The measurement of the center frequency is readily performed, since the spectrum of the received digital signal is known in advance. The center frequency of the filters 2' and 7' is tuned by controlling the magnetic flux applied to the YIG single crystal for a YIG filter, or by controlling the voltage across the varactor diode for an LC filter.

Figure 9:
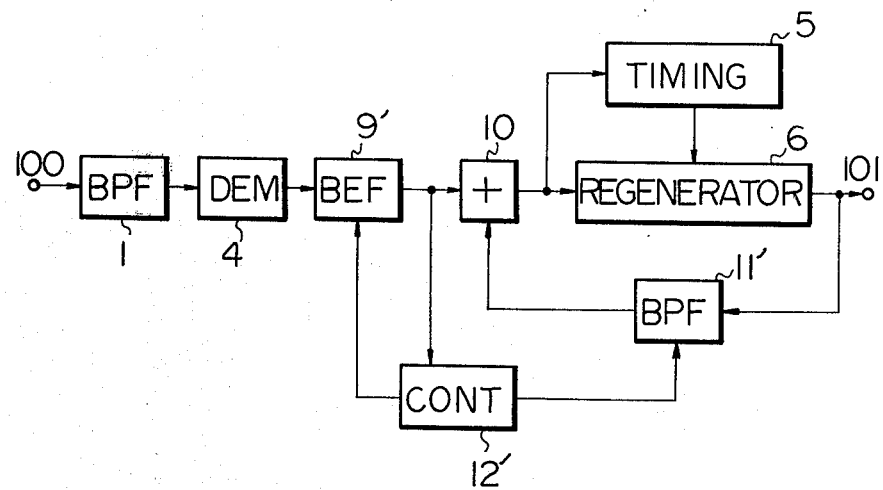
FIG. 9 is the still another configuration of the present receiver, which adaptively operates to eliminate an interference energy.

FIG. 9 is still another embodiment of the digital signal reception system according to the present invention, in which an adaptive operation to the change of the interference frequency is also performed. In the embodiment of FIG. 9, the filters are provided in the baseband as in the case of FIG. 6. Therefore, the band-elimination filter 9 and the bandpass filter 11 in FIG. 6 are altered to the adaptive band-elimination filter 9' and the adaptive bandpass filter 11', respectively, in FIG. 9. The apparatus of FIG. 9 has the control circuit 12' to control the center frequency of the filters 9' and 11'. The operation of the apparatus in FIG. 9 is similar to that of the embodiments of FIG. 6 and FIG. 8, and is obvious to those skilled in the art from the above description.

In the particular case, when the center frequency of the interference is the same as that of the digital radio signal the band-elimination filter 2 and the bandpass filter 8 with the center frequency $f_O$ in FIG. 3 are adoptable, and also the high pass filter and the low pass filter are adoptable for the band-elimination filter 9 and the bandpass filter 11 in FIG. 6 respectively.

Figure 10:
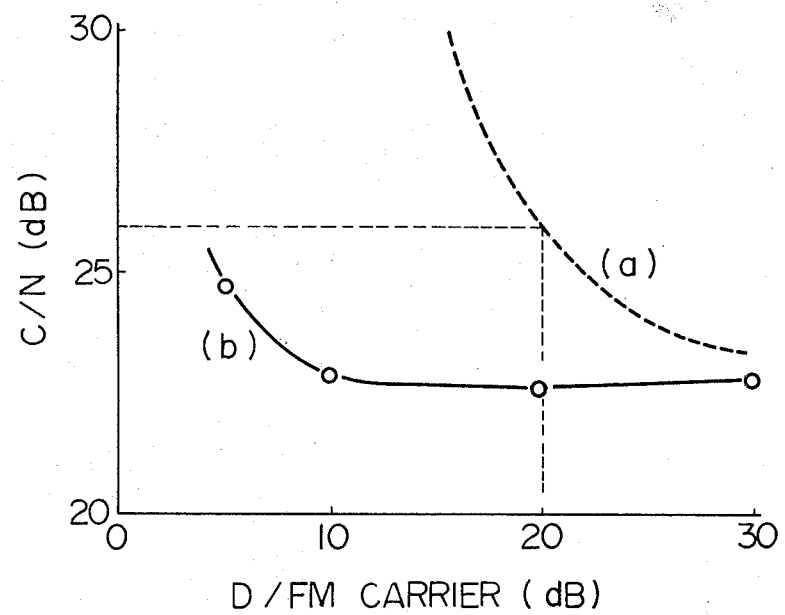
FIG. 10 shows the improved effect of the present invention.

FIG. 10 shows the improvement effect of the present invention. In FIG. 10, the horizontal axis indicates the desired digital signal to the FM carrier power ratio, and the vertical axis indicates the C/N of the digital system for the predetermined error rate (in this case, the error rate is $10^{-6}$). The curve (a) shows the relation when the present invention is not utilized, and the curve (b) shows the result when the present invention is utilized, where the pulse repetition period of the digital signal is 20 nanoseconds (50 MHz symbol rate of the digital signal), and the absolute delay time of the feed back loop is about 5 nanoseconds (the delay time in the loop having a demodulator, a regenerator, a modulator, a bandpass filter and an adder in FIG. 3). From FIG. 10, at the desired signal power to interference FM power ratio of 20 dB, the (C/N) of 26 dB is required to obtain the error rate of $10^{-6}$ when the present invention is not employed. However, by using the present invention, the required (C/N) is reduced to 22.5 dB. Thus, 3.5 dB of C/N improvement is achieved.

As mentioned above, the present invention can solve the C/N degradation problem caused by the inband interference without increasing the transmitting power of the digital system. Because of the reduced transmitting power, it becomes possible to implement a low power amplifier with a semiconductor circuit. Thus, the transmitter becomes small size, and the power consumption of the system is reduced. As a result, the system reliability increases. Further, it becomes possible to operate in the linear region of the power amplifier. Finally, the improved digital transmission system can be easily achieved.

In addition to this, when the present invention is applied in a wireless communication system, the possible site selection is widened without the need to improve the antenna directivity. Thus, a digital radio system can co-exist with an analog FM system in the same frequency band.

From the foregoing it will now be apparent that a new and improved digital signal reception system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A digital signal reception system in a wireless communication system comprising at least an input terminal to which a modulated digital signal is applied, a demodulator for demodulating the modulated digital signal to obtain the baseband thereof, a regenerator coupled to the output of the demodulator for regenerating the digital signal, and an output terminal connected to the output of the regenerator to provide the regenerated digital signal, the improvement comprising, in combination: a band-elimination filter for removing an interference component within the frequency spectrum of the modulated digital signal before regeneration thereof by said regenerator, a bandpass filter coupled to the output of said output terminal, the center frequency of said bandpass filter being the same as that of said band-elimination filter, and an adder for adding the output of said band-elimination filter and the output of said bandpass filter, the output of said adder being coupled to the input of said regenerator.

2. A digital signal reception system according to claim 1, wherein said band-elimination filter and said adder are provided before said demodulator, and further comprising a modulator coupled between said output terminal and said bandpass filter.

3. A digital signal reception system according to claim 2, wherein said band-elimination filter and said bandpass filter are adaptive filters, the center frequency of which follow to the frequency of an interference component.

4. A digital signal reception system according to claim 1, wherein said band-elimination filter and said bandpass filter comprise of a YIG filter.

5. For use in a digital signal reception system that receives a modulated digital signal that may contain an interference component, and includes a demodulator for demodulating the modulated digital signal, and a regenerator coupled to the demodulator for regenerating the digital signal, the improvement comprising, in combination:

a band-elimination filter for removing a portion of the frequency spectrum of said modulated digital signal that contains said interference component;

means responsive to the output of said regenerator for substantially reconstituting said portion of the spectrum of said modulated digital signal removed by said band-elimination filter; and means for feeding back and adding the reconstituted portion of said digital signal to the modulated filtered digital signal before the demodulation and regeneration thereof.

6. The system as defined by claim 5 wherein said reconstituting means includes a bandpass filter.

7. The system as defined by claim 6 wherein said band-elimination filter and said bandpass filter are variable filters under common control.

8. The system as defined by claim 5 wherein said reconstituting means comprises means for modulating the output of said regenerating means and a bandpass filter.

9. The system as defined by claim 5 wherein said interference component is expected to have a frequency spectrum that is centered at a given frequency, and wherein said band-elimination filter has a center frequency at about the same frequency as the center frequency of said interference component.

10. The system as defined by claim 9 wherein said band-elimination filter is a variable filter.

11. For use in a digital signal reception system that receives a modulated digital signal that may contain an interference component, and includes a demodulator for demodulatng the modulated digital signal, and a regenerator for regenerating the digital signal, the improvement comprising, in combination:

a band-elimination filter coupled to the output of said demodulator for removing a portion of the frequency spectrum of the demodulated digital signal that contains said interference component;

means responsive to the output of said regenerator for substantially reconstituting said portion of the spectrum of said demodulated digital signal removed by said band-elimination filter;

means for feeding back and adding the reconstituted portion of said demodulated digital signal to the filtered demodulated digital signal; and means for coupling the added signal to said regenerator.

12. The system as defined by claim 11 wherein said reconstituting means includes a bandpass filter.

13. The system as defined by claim 12 wherein said band-elimination filter and said bandpass filter are variable filters under common control.

14. The system as defined by claim 11 wherein said interference component is expected to have a frequency spectrum that is centered at a given frequency, and wherein said band-elimination filter has a center frequency at about the same frequency as the center frequency of said interference component.

15. The system as defined by claim 14 wherein said band-elimination filter is a variable filter.

* * * * *